United States Patent [19]

Hahn et al.

[11] Patent Number: 5,298,610

[45] Date of Patent: Mar. 29, 1994

[54] THIAZOLEAZO DYES HAVING A COUPLING COMPONENT OF THE DIPHENYLAMINE SERIES

[75] Inventors: Erwin Hahn, Heidelberg; Matthias Wiesenfeldt, Mutterstadt; Helmut Reichelt, Neustadt; Sabine Gruettner-Merten, Mutterstadt, all of Fed. Rep. of Germany

[73] Assignee: BASF Aktiengesellschaft, Ludwigshafen, Fed. Rep. of Germany

[21] Appl. No.: 893,843

[22] Filed: Jun. 4, 1992

[30] Foreign Application Priority Data

Jun. 20, 1991 [DE] Fed. Rep. of Germany ....... 4120362

[51] Int. Cl.$^5$ ................... C09B 29/042; C09B 29/09; D06P 3/52
[52] U.S. Cl. ........................... 534/774; 534/588; 534/733; 534/794; 8/922
[58] Field of Search ............ 534/774, 794, 733

[56] References Cited

U.S. PATENT DOCUMENTS

| | | | |
|---|---|---|---|
| 2,683,709 | 7/1954 | Dickey et al. | 534/794 |
| 2,871,231 | 1/1959 | Straley et al. | 534/794 X |
| 3,829,410 | 8/1974 | Fisher et al. | 534/794 X |
| 4,153,607 | 5/1979 | Erlingsfeld | 548/153 |
| 4,238,407 | 12/1980 | Fauss et al. | 558/415 |
| 4,324,899 | 4/1982 | Frishberg | 548/190 |
| 4,395,544 | 7/1983 | Egli | 548/194 X |

(List continued on next page.)

FOREIGN PATENT DOCUMENTS

| | | |
|---|---|---|
| 760649 | 5/1971 | Belgium . |
| 30695 | 6/1981 | European Pat. Off. ............ 534/794 |

(List continued on next page.)

OTHER PUBLICATIONS

Methoden Der Organischen Chemie, vol. X/3, 1965, 3 pages, R. Stroh, "Strickstoff-Verbindungen I".

Primary Examiner—Mary C. Lee
Assistant Examiner—Fiona T. Powers
Attorney, Agent, or Firm—Oblon, Spivak, McClelland, Maier & Neustadt

[57] ABSTRACT

Thiazoleazo dyes useful for dyeing or printing textile fibers have the formula

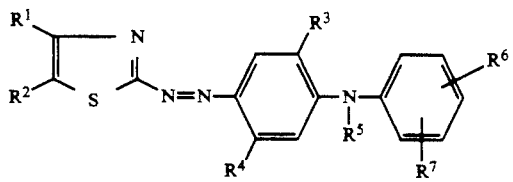

where
$R^1$ is hydrogen, substituted or unsubstituted $C_1$–$C_6$-alkyl, halogen, substituted or unsubstituted $C_1$–$C_6$-alkoxy, substituted or unsubstituted $C_1$–$C_6$alkythio, substituted or unsubstituted phenylthio, $C_1$–$C_6$-alkylsulfonyl, substituted or unsubstituted phenylsulfonyl or $C_1$–$C_4$-alkoxycarbonyl,
$R^2$ is cyano, $C_1$–$C_4$-alkanoyl, benzoyl, $C_1$–$C_6$alkylsulfonyl, substituted or unsubstituted phenylsulfonyl or a radical of the formula —CH=T, where T is the radical of an acidic CH compound,
$R^3$ is hydrogen, substituted or unsubstituted $C_1$–$C_6$-alkoxy, $C_1$–$C_4$-alkoxycarbonyl, carbamoyl or mono- or di-$C_1$–$C_4$-alkylcarbamoyl,
$R^4$ is $C_1$–$C_6$-alkyl, substituted or unsubstituted $C_1$–$C_6$-alkoxy, substituted or unsubstituted $C_1$–$C_4$-alkoxycarbonyloxy substituted or unsubstituted phenoxycarbonyloxy, substituted aminocarbonyloxy, substituted or unsubstituted $C_1$–$C_4$-alkanoyloxy, substituted or unsubstituted $C_1$–$C_4$-alkanoylamino or substituted or unsubstituted phenyl,
$R^5$ is hydrogen, substituted or unsubstituted $C_1$–$C_{10}$-alkyl, or substituted or unsubstituted $C_3$–$C_5$-alkenyl, and
$R^6$ and $R^7$ are hydrogen, halogen, cyano, substituted or unsubstituted $C_1$–$C_{10}$-alkyl, amino or mono- or di-$C_1$–$C_4$-alkylamino.

2 Claims, No Drawings

U.S. PATENT DOCUMENTS

| | | | |
|---|---|---|---|
| 4,431,585 | 2/1984 | Tappe et al. | 534/794 X |
| 4,505,857 | 3/1985 | Egli | 534/794 X |
| 4,542,207 | 9/1985 | Niwa et al. | 534/794 X |

FOREIGN PATENT DOCUMENTS

| | | | |
|---|---|---|---|
| 0035671 | 9/1981 | European Pat. Off. | |
| 0139844 | 5/1985 | European Pat. Off. | |
| 2113154 | 10/1971 | Fed. Rep. of Germany. | |
| 2329388 | 1/1975 | Fed. Rep. of Germany. | |
| 2713573 | 10/1978 | Fed. Rep. of Germany. | |
| 2851514 | 6/1980 | Fed. Rep. of Germany. | |
| 3015121 | 11/1980 | Fed. Rep. of Germany. | |
| 3108077 | 1/1982 | Fed. Rep. of Germany. | |
| 3313797 | 10/1983 | Fed. Rep. of Germany. | |
| 3412293 | 10/1985 | Fed. Rep. of Germany. | |
| 2070050 | 9/1981 | United Kingdom | 534/794 |
| 2071684 | 9/1981 | United Kingdom. | |

THIAZOLEAZO DYES HAVING A COUPLING COMPONENT OF THE DIPHENYLAMINE SERIES

The present invention relates to novel thiazoleazo dyes of the formula I

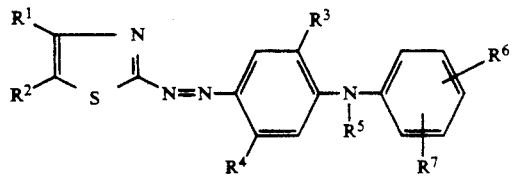

where
- $R^1$ is hydrogen, $C_1-C_6$-alkyl, $C_1-C_6$-monooxaalkyl $C_1-C_6$-dioxadlkyl, halogen, unsubstituted or phenyl-substituted $C_1-C_6$-alkoxy, unsubstituted or phenyl-substituted $C_1-C_6$-alkylthio, substituted or unsubstituted phenylthio, $C_1-C_6$-alkylsulf onyl, substituted or unsubstituted phenylsulfonyl or $C_1-C_4$-alkoxycarbonyl,
- $R^2$ is cyano, $C_1-C_4$-alkanoyl, benzoyl, $C_1-C_6$-alkylsulfonyl, substituted or unsubstituted phenylsulfonyl or a radical of the formula —CH=T, where T is the radical of an acidic CH compound,
- $R^3$ is hydrogen, $C_1-C_6$-alkoxy, which may be hydroxyl- or $C_1-C_4$-alkoxy-substituted, $C_1-C_4$-alkoxycarbonyl, carbamoyl or mono- or di-$C_1-C_4$-alkylcarbamoyl,
- $R^4$ is $C_1-C_6$-alkyl, $C_1-C_6$-alkoxy, which may be hydroxyl-, $C_1-C_4$-alkoxy- or $C_1-C_4$-alkanoyloxy-substituted, $C_1-C_4$-alkoxycarbonyloxy, which may be hydroxyl- or $C_1-C_4$-alkoxy-substituted, substituted or unsubstituted phenoxycarbonyloxy, a radical of the formula

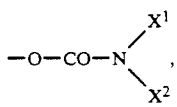

where $X^1$ and $X^2$ are identical or different and each is independently of the other $C_1-C_6$-alkyl, which may be $C_1-C_4$-alkoxy-substituted, or $X^1$ and $X^2$ together with the nitrogen atom joining them together are a five- or six-membered saturated heterocyclic radical with or without further hetero atoms, unsubstituted or hydroxyl-, chlorine-, cyano-, $C_1-C_4$-alkoxy- or phenoxy-substituted $C_1-C_4$-alkanoyloxy, unsubstituted or hydroxyl-, chlorine-, cyano-, $C_1-C_4$-alkoxy-, phenoxy- or $C_1-C_4$-alkanoyloxy-substituted $C_1-C_4$-alkanoylamino or unsubstituted or chlorine-, cyano-, nitro-, $C_1-C_4$-alkyl-, $C_1-C_4$-alkoxy-, $C_1-C_4$-alkoxycarconyl- or $C_1-C_4$-alkylsulfonyl-substituted phenyl,
- $R^5$ is hydrogen, $C_1-C_{10}$-alkyl, which may be hydroxyl-, halogen-, cyano-, $C_1-C_4$-alkanoyloxy- or $C_1-C_4$-alkoxycarbonyl-substituted and may be interrupted by from 1 to 3 oxygen atoms in ether function, or unsubstituted or hydroxyl-, halogen-, $C_1-C_4$-alkoxy- or $C_1-C_4$-alkanoyloxy-substituted $C_3-C_4$-alkenyl, and
- $R^6$ and $R^7$ are identical or different and each is independently of the other hydrogen, halogen, cyano, $C_1-C_{10}$-alkyl, which may be hydroxyl-, halogen-, cyano-, $C_1-C_4$-alkanoyloxy- or $C_1-C_4$-alkoxycarbonyl-substituted and can be interrupted by from 1 to 3 oxygen atoms in ether function, $C_1-C_4$-alkoxy, which may be hydroxyl- or $C_1-C_4$-alkanoyloxy-substituted, amino or mono- or di-$C_1-C_4$-alkylamino, and to the use thereof for dyeing or printing textile fibers.

DE-A-2 113 154 discloses azo dyes which are similar to those of the abovementioned formula I but which are based on 2-amino-4-phenylthiazoles as diazo component.

Furthermore, DE-A-3 108 077 describes azo dyes where the diazo component is 2-amino-4-chloro-5-formylthiazole or a condensation product thereof with an acidic CH compound and where the coupling component is an aniline derivative.

It is an object of the present invention to provide novel thiazoleazo dyes which possess an advantageous balance of application properties.

We have found that this object is achieved by the hereinbefore more particularly identified thiazoleazo dyes of the formula I.

Any alkyl or alkenyl appearing in the abovementioned formula I may be either straight-chain or branched.

Any substituted phenyl appearing in the abovementioned formula I may have as substituents, unless otherwise stated, for example $C_1-C_4$-alkyl, halogen, especially chlorine or bromine, or $C_1-C_4$-alkoxy. The phenyl radicals have in general from 1 to 3 substituents.

$R^1$, $R^4$, $R^5$, $R^6$, $R^7$, $X^1$ and $X^2$ are each f or example methyl, ethyl, propyl, isopropyl, butyl, isobutyl, sec-butyl, pentyl, isopentyl, neopentyl, tert-pentyl, hexyl or 2-methylpentyl.

$R^5$, $R^6$ and $R^7$ may each also be for example hexyl, heptyl, octyl, 2-ethylhexyl, nonyl or decyl.

$R^1$, $R^5$, $R^6$, $R^7$, $X^1$ and $X^2$ may each also be for example 2-methoxyethyl, 2-ethoxyethyl, 2-propoxyethyl, 2-butoxyethyl, 2-isobutoxyethyl, 2- or 3-methoxypropyl, 1-methoxyprop-2-yl, 2- or 3-ethoxypropyl or 2- or 3-propoxypropyl.

$R^1$, $R^5$, $R^6$ and $R^7$ may each also be for example 3,6-dioxaheptyl, 3,6-dioxaoctyl or 4,7-dioxaoctyl.

$R^5$, $R^6$ and $R^7$ may each also be for example 4,7-dioxanonyl, 4,8-dioxadecyl, 4,6-dioxaundecyl, 3,6,9-trioxaundecyl, 4,7,10-trioxaundecyl or 4,7,10-trioxadodecyl.

$R^1$ may also be for example methylthio, ethylthio, propylthio, isopropylthio, butylthio, isobutylthio, pentylthio, hexylthio, benzylthio, 1- or 2-phenylethylthio, phenylthio, 2-methylphenylthio, 2-methoxyphenylthio, 2-chlorophenylthio, benzyloxy or 1- or 2-phenylethoxy.

$R^1$ and also $R^3$, $R^4$, $R^6$ and $R^7$ may each also be for example methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

$R^1$, $R^6$ and $R^7$ may each also be for example fluorine, chlorine or bromine.

$R^1$ and $R^2$ may each also be for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexylsulfonyl, phenylsulfonyl, 2-methylphenylsulfonyl, 2-methoxyphenylsulfonyl or 2-chlorophenylsulfonyl.

$R^1$ and $R^3$ may each also be for example methoxycarbonyl, ethoxycarbonyl, propoxycarbonyl, isopropoxycarbonyl, butoxycarbonyl, isobutoxycarbonyl or sec-butoxycarbonyl.

$R^3$, $R^4$, $R^6$ and $R^7$ may each also be for example 2-hydroxyethoxy, 2- or 3-hydroxypropoxy, 2- or 4-hydroxybutoxy, 5-hydroxypentyloxy or 6-hydroxyhexyloxy.

$R^3$ and $R^4$ may each also be for example 2-methoxyethoxy, 2-ethoxyethoxy, 2- or 3-methoxypropoxy, 2- or 3-ethoxypropoxy, 2- or 4-methoxybutoxy, 2- or 4-ethoxybutoxy, 5-methoxypentyloxy, 5-ethoxypentyloxy, 6-methoxyhexyloxy or 6-ethoxyhexyloxy.

$R^3$ may also be f or example mono- or dimethylcarbamoyl, mono- or diethylcarbamoyl, mono- or dipropylcarbamoyl, mono- or diisopropylcarbamoyl, mono- or dibutylcarbamoyl or N-methyl-N-ethylcarbamoyl.

$R^4$, $R^6$ and $R^7$ may each also be for example 2-acetyloxyethoxy, 2- or 3-acetyloxypropoxy, 2- or 4-acetyloxybutoxy, 5-acetyloxypentyloxy or 6-acetyloxyhexyloxy.

$R^5$, $R^6$ and $R^7$ may each also be for example 2-hydroxyethyl, 2-chloroethyl, 2-cyanoethyl, 2-acetyloxyethyl, 2-methoxycarbonylethyl, 2-ethoxycarbonylethyl, 2- or 3-hydroxypropyl, 2- or 3-chloropropyl, 2- or 3-cyanopropyl, 2- or 3-acetyloxypropyl, 2- or 3-cyanopropyl, 2- or 3-acetyloxypropyl, 2- or 3-cyanopropyl, 2- or 3-acetyloxypropyl, 2- or 3-methoxycarbonylpropyl, 2- or 3-ethoxycarbonylpropyl, 2- or 4-hydroxybutyl, 2- or 4-chlorobutyl, 2- or 4-cyanobutyl, 2- or 4-acetyloxybutyl, 2- or 4-methoxycarbonylbutyl or 2- or 4-ethoxycarbonylbutyl.

$R^5$ may also be for example prop-2-en-1-yl, but-2-en-1-yl, 2-methylprop-2-en-1-yl, 2-ethylprop-2-en-1-yl, 2-methylbut-2-en-1-yl, 3-chloroprop-2-en-1-yl, 4-chlorobut-2-en-1-yl, 4-hydroxybut-2-en-1-yl, 4-methoxybut-2-en-1-yl or 4-acetyloxybut-2-en-1-yl.

$R^6$ and $R^7$ may each also be f or example mono- or dimethylamino, mono- or diethylamino, mono- or dipropylamino, mono- or dibutylamino or N-methyl-N-ethylamino.

$R^4$ may also be for example methoxycarbonyloxy, ethoxycarbonyloxy, propoxycarbonyloxy, isopropoxycarbonyloxy, butoxycarbonyloxy, 2-hydroxyethoxycarbonyloxy, 2-methoxyethoxycarbonyloxy, 2-ethoxyethoxycarbonyloxy, phenoxycarbonyloxy, 2-methylphenoxycarbonyloxy, 2-methoxyphenoxycarbonyloxy, 2-chlorophenoxycarbonyloxy, formyloxy, acetyloxy, propionyloxy, butyryloxy, hydroxyacetyloxy, chloroacetyloxy, cyanoacetyloxy, methoxyacetyloxy, ethoxyacetyloxy, phenoxyacetyloxy, formylamino, acetylamino, propionylamino, butyrylamino, hydroxyacetylamino, chloroacetylamino, cyanoacetylamino, methoxyacetylamino, ethoxyacetylamino, phenoxyacetylamino, 2-, 3- or chlorophenyl, 2,4-dichlorophenyl, 2-, 3- or 4-cyanophenyl, 2-, 3- or 4-methylphenyl, 2,4-dimethylphenyl, 4-isopropylphenyl, 2-, 3- or 4-methoxyphenyl, 2,4-dimethoxyphenyl, 2-, 3- or 4-methoxycarbonylphenyl, 2-., 3- or 4-ethoxycarbonylphenyl, 2-, 3- or 4-methylsulfonylphenyl, 2-, 3- or 4-ethylsulfonylphenyl or 2-, 3- or 4-nitrophenyl.

When $X^1$ and $X^2$, together with the nitrogen atom joining them together, form a five- or six-membered saturated heterocyclic radical with or without further hetero atoms, the radical in question may be for example pyrrolidinyl, piperidinyl, morpholinyl, piperazinyl or N-$C_1$-$C_4$-alkylpiperazinyl, such as N-methyl- or N-ethylpiperazinyl.

$R^2$ may also be for example formyl, acetyl, propionyl or butyryl.

When $R^2$ is —CH=T, where T is derived from an acidic CH compound $H_2T$, possible acidic CH compounds $H_2T$ are for example compounds of the formulae IIa to IIf

 (IIa)

 (IIb)

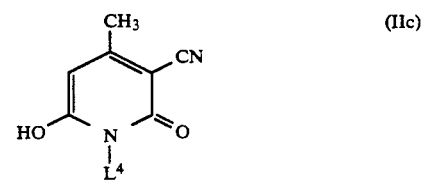 (IIc)

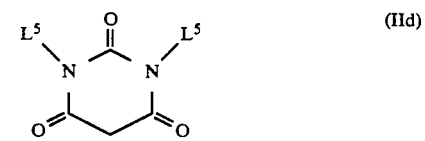 (IId)

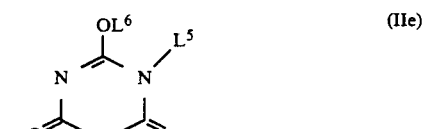 (IIe)

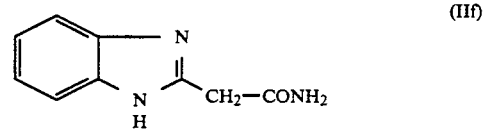 (IIf)

where
$L^1$ is cyano, nitro, $C_1$-$C_4$-alkanoyl substituted or unsubstituted benzoyl $C_1$-$C_4$-alkylsulfonyl, substituted or unsubstituted phenylsulfonyl, carboxyl, $C_1$-$C_4$-alkoxycarbonyl, phenoxycarbonyl, carbamoyl, mono- or di-$C_1$-$C_4$-alkyl carbamoyl, substituted or unsubstituted phenylcarbamoyl, substituted or unsubstituted phenyl, benzothiazol-2-yl, benzimidazol-2-yl, 5-phenyl-1,3,4-thiadiazol-2-yl or 2-hydroxyquinoxalin-3-yl, $L^2$ is $C_1$-$C_4$-alkyl or $C_1$-$C_4$-alkoxyl $L^3$ is $C_1$-$C_4$-alkoxycarbonyl, phenylcarbamoyl or benzimidazol-2-yl, $L^4$ is hydrogen or $C_1$-$C_6$-alkyl, $L^5$ is hydrogen, $C_1$-$C_4$-alkyl or phenyl, and $L^6$ is $C_1$-$C_4$-alkyl.

A particular mention must go to the radical of the formula IIa or IIb where $L^1$ is cyano, $C_1$-$C_4$-alkanoyl or $C_1$-$C_4$-alkoxycarbonyl, $L^2$ is $C_1$-$C_4$-alkyl or $C_1$-$C_4$-alkoxy and $L^3$ is $C_1$-$C_4$-alkoxycarbonyl.

A particular mention must go to the radical of the formula IIa or IIb where $L^1$ is cyano or $C_1$-$C_4$-alkoxycarbonyl, $L^2$ is $C_1$-$C_4$-alkoxy and $L^3$ is $C_1$-$C_4$-alkoxycarbonyl.

Preference is given to thiazoleazo dyes of the formula I where $R^1$ is chlorine, bromine, $C_1$–$C_4$-alkoxy, $C_1$–$C_4$-alkylthio, phenylthio, $C_1$–$C_4$-alkylsulfonyl, phenylsulfonyl or $C_1$–$C_4$-alkoxycarbonyl, $R^2$ is cyano, formyl or a radical of the formula

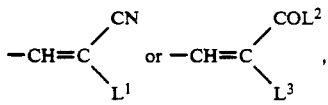

where $L^1$ is cyano, $C_1$–$C_4$-alkanoyl or $C_1$–$C_4$-alkoxycarbonyl, $L^2$ is $C_1$–$C_4$-alkyl or $C_1$–$C_4$-alkoxy, and $L^3$ is $C_1$–$C_4$-alkoxycarbonyl, $R^3$ is hydrogen or $C_1$–$C_6$-alkoxy, which may be hydroxyl- or $C_1$–$C_4$-alkoxy-substituted, $R^4$ is $C_1$–$C_6$-alkoxy, which may be hydroxyl-, $C_1$–$C_4$-alkoxy- or $C_1$–$C_4$-alkanoyloxy-substituted, a radical of the formula

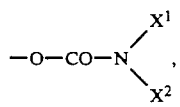

where $X^1$ and $X^2$ are each as defined in claim 1, or $C_1$–$C_4$-alkanoylamino, which may be hydroxyl-, cyano- or $C_1$–$C_4$-alkoxy-substituted, $R^5$ is hydrogen, $C_1$–$C_6$-alkyl, which may be hydroxyl- or $C_1$–$C_4$-alkanoyloxy-substituted and can be interrupted by 1 or 2 oxygen atoms in ether function, and $R^6$ and $R^7$ are each independently of the other hydrogen, halogen, $C_1$–$C_4$-alkyl, which may be hydroxyl- or $C_1$–$C_4$-alkanoyloxy-substituted, or $C_1$–$C_6$-alkoxy, which may be hydroxyl- or $C_1$–$C_4$-alkanoyloxy-substituted.

Particular preference is given to thiazoleazo dyes of the formula I where $R^1$ is chlorine, phenylsulfonyl or $C_1$–$C_4$-alkoxycarbonyl, $R^2$ is cyano, formyl or a radical of the formula

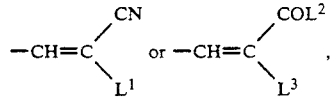

where $L^1$ is cyano or $C_1$–$C_4$-alkoxycarbonyl, $L^2$ is $C_1$–$C_4$-alkoxy, and $L^3$ is $C_1$–$C_4$-alkoxycarbonyl, $R^3$ is hydrogen or $C_1$–$C_6$-alkoxy, which may be hydroxyl- or $C_1$–$C_4$-alkoxy-substituted, $R^4$ is $C_1$–$C_6$-alkoxy, which may be hydroxyl-, $C_1$–$C_4$-alkoxy- or $C_1$–$C_4$-alkanoyloxy-substituted, $C_1$–$C_6$-dialkylaminocarbonyloxy or unsubstituted or $C_1$–$C_4$-alkoxysubstituted $C_1$–$C_4$-alkanoylamino, $R^5$ is hydrogen or $C_1$–$C_4$-alkyl, which may be substituted by hydroxyl and interrupted by an oxygen atom in ether function, $R^6$ is hydrogen, chlorine, bromine, $C_1$–$C_4$-alkyl, which may be hydroxyl-substituted, or $C_1$–$C_6$-alkoxy, which may be hydroxyl-substituted, and $R^7$ is hydrogen or $C_1$–$C_6$-alkyl, which may be hydroxyl-substituted.

Of particular interest are thiazoleazo dyes of the formula I where $R^1$ is chlorine and $R^2$ is cyano or formyl.

Also of particular interest are thiazoleazo dyes of the formula I where $R^3$ is hydrogen or $C_1$–$C_4$-alkoxy, in particular methoxy, and $R^4$ is $C_1$–$C_4$-alkanoylamino, in particular acetylamino, or hydroxyl- or $C_1$–$C_4$-alkoxy-substituted $C_1$–$C_4$-alkoxy, in particular 2-hydroxyethoxy.

Also of particular interest are thiazoleazo dyes of the formula I where $R^5$ is hydrogen or unsubstituted or hydroxyl-substituted $C_1$–$C_4$-alkyl, $R^6$ is hydrogen, and $R^7$ is unsubstituted or hydroxyl-substituted $C_1$–$C_4$-alkyl or unsubstituted or hydroxyl-substituted $C_1$–$C_4$-alkoxy.

The preparation of the thiazoleazo dyes of the formula I can be carried out in a conventional manner. For example, the amine of the formula III

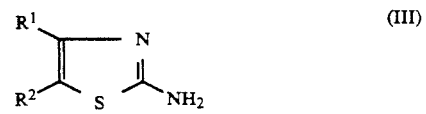

wherein $R^1$ and $R^2$ are each as defined above, can be converted in a conventional manner into the diazonium salt and this diazonium salt can be coupled in a conventional manner with a diphenylamine of the formula IV

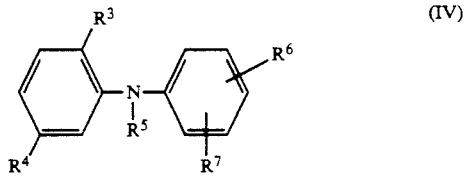

where $R^3$, $R^4$, $R^5$, $R^6$ and $R^7$ are each as defined above.

However, it is also possible to react diazonium salts of diazo components of the formula IIIa

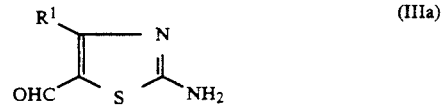

where $R^1$ is as defined above, with the diphenylamines of the formula IV to give the azo dyes of the formula I (Z=formyl) and optionally condensing the resulting dyes with compounds of the formula $H_2T$ in a conventional manner.

The starting compounds III and IV are known per se or can be prepared by methods known per se (eg. Houben-Weyl, Methoden der Organischen Chemie, Volume 10/3, DE-A-3 015 212, DE-A-2 329 388, DE-A-2 851 514, EP-A-139 444, DE-A-2 713 573, DE-A-3 412 293 or US-A-4 324 899).

It is also possible to use the amines of the formula III and the phenols of the formula V

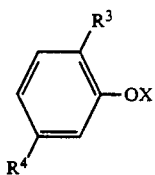

(V)

where $R^3$ and $R^4$ are each as defined above and X is $C_1$–$C_6$-alkyl, phenylsulfonyl, 4-nitrophenylsulfonyl or $C_1$–$C_4$-alkanoyl, to prepare the azo dye of the formula VI

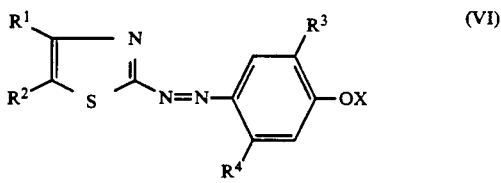

(VI)

where $R^1$, $R^2$, $R^3$, $R^4$ and X are each as defined above, and then to subject this azo dye to a nucleophilic substitution reaction with an aniline derivative of the formula VII

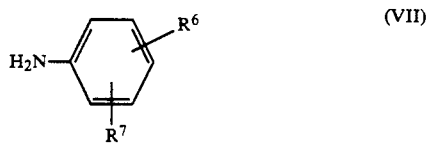

(VII)

where $R^6$ and $R^7$ are each as defined above (see for example EP-A-237 910).

The thiazoleazo dyes of the formula I according to the present invention are advantageously suitable for use as disperse dyes for dyeing or printing textile fibers, in particular polyesters, but also fibers of cellulose esters, polyamides or blend fabrics composed of polyesters and cellulose fibers.

To obtain a favorable color buildup, it can be advantageous in some cases to dye with mixtures of the dyes of the formula I with one another.

The novel thiazoleazo dyes have excellent dyeing properties. Applied by the commonly known high temperature dyeing method, they produce, in particular on polyesters, violet, blue or navy dyeings of high color strength which have very good fastness properties, in particular a good light fastness and a good fastness to dry heat setting and pleating.

The thiazoleazo dyes according to the present invention are also advantageous for transfer from a so-called transfer to plastic-coated paper by means of an energy source (see for example EP-A-416 434).

The invention will now be more particularly described by way of example.

EXAMPLES

Example 1

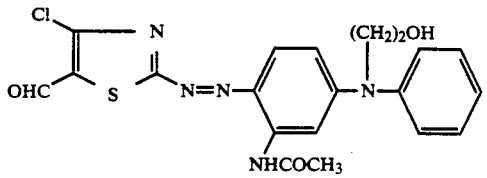

8 g (0.05 mol) of 2-amino-3-cyano-4-chloro-5-formyl-thiazole were stirred in 60 ml of 85% by weight sulfuric acid at not more than 30° C. 16.6 g of nitrosylsulfuric acid (11.5% by weight of $N_2O_3$) were added dropwise at from 0° to 5° C. in the course of 30 minutes. This mixture was then stirred at that temperature for a further 2 hours.

The resulting diazonium salt solution was gradually added dropwise at from 0° to 5° C. to a solution of 13.5 g (0.05 mol) of N-phenyl-N-2-hydroxyethyl-3-acetylaminoaniline in 25 ml of N,N-dimethylformamide, 100 ml of water, 20 ml of dilute hydrochloric acid, 0.5 g of amidosulfuric acid and 300 g of ice.

Thereafter the precipitated dye was filtered off, washed neutral and dried. 21 g of dye were obtained. It dyes polyester staple fiber fabric in a navy shade.

Example 2

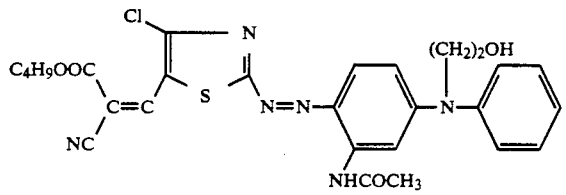

1.7 g of the dye of Example 1 were dissolved in 100 ml of propanol and 20 ml of N,N-dimethylformamide and were mixed with 0.2 g of sodium acetate. 1.43 g of butyl cyanoacetate were added to the solution, and the mixture was stirred at 25° C. for 12 hours. The resulting solution was added to 200 ml of ice-water, and the precipitated dye was filtered off with suction, washed with water and dried at 50° C. under reduced pressure. This left 1.2 g of dye of melting point 124° C., $UV_{max}$ (acetone) = 599 nm ($\epsilon$ 37,000), which dyes polyester fibers in a fast navy shade.

The same method gives the dyes listed below in Table 1.

TABLE 1

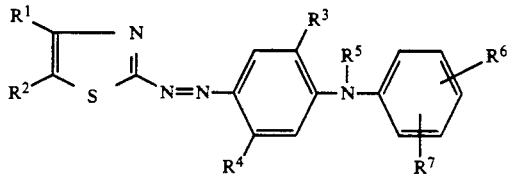

| example | $R^1$ | $R^2$ | $R^3$ | $R^4$ | $R^5$ | $R^6$ | $R^7$ |
|---------|-------|-------|-------|-------|-------|-------|-------|
| 3 | Cl | CHO | H | NHCOC$_2$H$_5$ | C$_2$H$_4$OH | H | H |

TABLE 1-continued

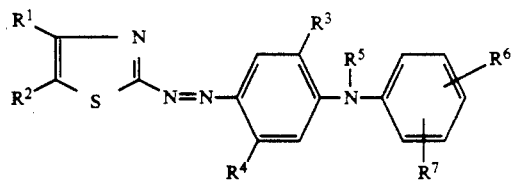

| example | R¹ | R² | R³ | R⁴ | R⁵ | R⁶ | R⁷ |
|---|---|---|---|---|---|---|---|
| 4 | Cl | CHO | H | NHCOCH₃ | H | H | H |
| 5 | Cl | CH=C(CN)CO₂C₄H₉ | H | NHCOCH₃ | C₂H₄OH | H | H |
| 6 | Cl | CHO | H | NHCOCH₂OCH₃ | C₂H₄OH | 4-OC₂H₅ | H |
| 7 | Cl | CHO | COOMe | NHCOCH₃ | C₂H₄OCOCH₃ | 4-OCH₃ | 3-CH₃ |
| 8 | Cl | CHO | H | NHCOCH₃ | C₂H₅ | 4-C₂H₅ | H |
| 9 | Cl | CH=C(CN)₂ | H | NHCOCH₃ | C₄H₉ | 4-CH(CH₃)₂ | H |
| 10 | Cl | CH=C(CN)₂ | H | OCH₃ | H | 2-CH₃ | H |
| 11 | Cl | CH=C(CN)CO₂C₂H₅ | H | OC₂H₄OH | C₂H₄OH | 3-CH₃ | 4-N(C₂H₅)₂ |
| 12 | Cl | CN | H | NHCOC₂H₅ | C₂H₄OH | 4-CH₃ | H |
| 13 | Cl | CN | COOC₂H₅ | NHCOCH₃ | C₂H₄OH | H | H |
| 14 | CH₃ | CHO | H | NHCOCH₃ | C₂H₄OH | H | H |
| 15 | Cl | CN | H | NHCOCH₂OC₂H₅ | C₂H₄OH | H | 4-OC₂H₅ |
| 16 | CO₂C₂H₅ | CO₂C₂H₅ | COOCH₃ | NHCOC₄H₉ | C₂H₄OH | 4-C₂H₄OH | H |
| 17 | CO₂C₂H₅ | CO₂C₂H₅ | H | NHCOC₄H₅ | C₂H₄OH | 4-Cl | H |
| 18 | CO₂CH₃ | CN | H | NHCOC₂H₅ | CH₂CH=CHCl | H | 4-OC₂H₄OH |
| 19 | CO₂C₂H₅ | CN | H | OCOC₂H₅ | C₂H₄OH | H | 4-OC₂H₅ |
| 20 | CO₂CH₃ | CN | H | OCON(CH₃)₂ | C₃H₇ | 4-OC₃H₇ | H |
| 21 | CH₃ | CO₂CH₃ | OCH₃ | NHCOCH₃ | C₂H₄OH | 4-C₂H₄OH | H |
| 22 | CH₃ | CO₂CH₃ | OCH₃ | OCOC₂H₅ | H | H | H |
| 23 | CH₃ | COCH₃ | H | NHCOCH₃ | C₂H₄OCOCH₃ | H | H |
| 24 | C₆H₅S | CHO | H | NHCOCH₃ | H | H | H |
| 25 | C₆H₅S | CHO | H | OC₂H₄OH | C₂H₄OH | 4-OC₂H₄OH | H |
| 26 | C₆H₁₁S | CHO | H | NHCOCH₃ | C₂H₄OCOCH₃ | H | H |
| 27 | C₄H₉S | CHO | H | NHCOCH₃ | C₂H₄OH | H | H |
| 28 | C₆H₅SO₂ | CHO | H | NHCOCH₃ | C₂H₄OCH₃ | H | H |
| 29 | H | CN | H | NHCOCH₃ | H | 4-CH₃ | H |
| 30 | C₂H₄OCH₃ | CHO | H | NHCOCH₃ | C₂H₄OH | H | H |
| 31 | OC₂H₅ | CN | H | OCON(CH₃)₂ | C₃H₇ | 3-CH₃ | 4-CH₃ |
| 32 | OC₂H₅ | CHO | H | NHCOCH₂OCH₃ | C₂H₄OCH₃ | 4-OCH₃ | 3-CH₃ |
| 33 | Cl | C₂H₅SO₂ | CO₂C₂H₅ | NHCOC₂H₅ | C₂H₅ | 4-Cl | H |
| 34 | Cl | C₆H₅CO₂ | CO₂CH₃ | NHCOCH₃ | C₂H₄OH | 4-Cl | H |
| 35 | Cl | CHO | CO₂CH₃ | OC₂H₄OH | H | 3-N(C₂H₅)₂ | 4-CH₃ |
| 36 | Cl | CHO | CON(C₂H₅)₂ | NHCOCH₃ | H | OC₂H₄OH | H |
| 37 | Cl | CN | COOC₆H₅ | NHCOCH₃ | H | H | H |
| 38 | Cl | CHO | H | NHCOCH₃ | C₂H₄OH | 4-OC₂H₄OH | H |

Example 39

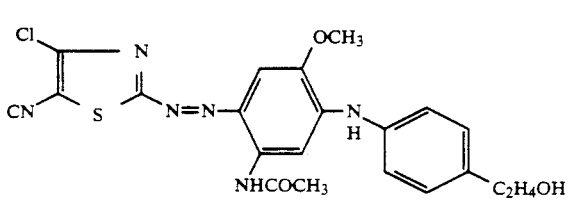

1.9 g of 2-(2-cyano-4,5-dimethoxyphenylazo)-4-chloro-5-cyanothiazole and 2.06 g of 4-(2-hydroxyethyl)-aniline were dissolved in 100 ml of N-methylpyrrolidinone and stirred at 120° C. for 6 hours. The solution was discharged on 500 ml of water, and the precipitate dye was filtered off, washed neutral and dried. This left 1.9 g of dye having a melting point of 213° C.

It dyes polyester fabric in a dark blue shade.

The dyes listed below in Table 2 are obtained in a similar manner.

TABLE 2

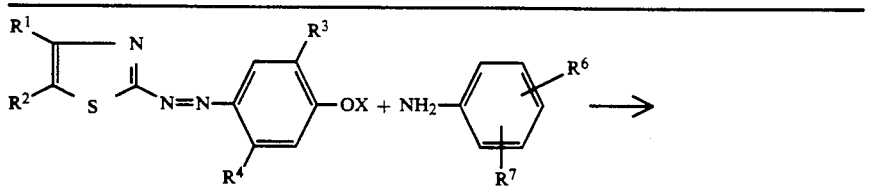

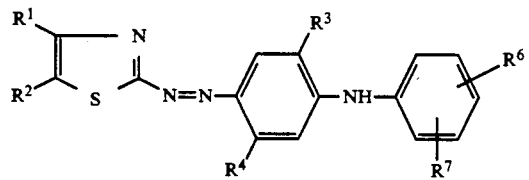

| example | $R^1$ | $R^2$ | $R^3$ | $R^4$ | $R^6$ | $R^7$ | X |
|---------|-------|-------|-------|-------|-------|-------|---|
| 40 | Cl | CN | $CO_2N(C_2H_5)_2$ | $NHCOCH_3$ | $4\text{-}OCH_3$ | $3\text{-}CH_3$ | $CH_3$ |
| 41 | Cl | CN | $OC_2H_4OH$ | $OC_2H_4OH$ | $4\text{-}C_2H_4OH$ | H | $C_2H_4OH$ |
| 42 | Cl | CN | $OC_2H_4OH$ | $OC_2H_4OCH_3$ | $4\text{-}OC_2H_4OH$ | $3\text{-}OC_2H_4OH$ | $C_2H_4OH$ |
| 43 | $CO_2CH_3$ | CN | $CO_2CH_3$ | $NHCOCH_3$ | $4\text{-}OC_2H_5$ | $3\text{-}OC_2H_5$ | $COCH_3$ |
| 44 | $CO_2CH_3$ | CN | $OCH_3$ | $NHCOC_2H_5$ | $3\text{-}CH_3$ | $4\text{-}CH_3$ | $CH_3$ |
| 45 | Cl | CHO | $OCH_3$ | $NHCOCH_3$ | $4\text{-}C_2H_4OH$ | H | $CH_3$ |
| 46 | Cl | CHO | $OC_2H_5$ | $NHCOCH_3$ | $4\text{-}OC_2H_4OH$ | H | $C_2H_5$ |
| 47 | Cl | CN | $OCH_3$ | $NHCOCH_3$ | $4\text{-}C_2H_5$ | H | $CH_3$ |
| 48 | $CO_2CH_3$ | CN | $OCH_3$ | $NHCOCH_3$ | $4\text{-}CH_3$ | $3\text{-}CH_3$ | $SO_2C_6H_5$ |
| 49 | Cl | CHO | $CO_2CH_3$ | $OC_2H_4OH$ | $4\text{-}OC_2H_4OH$ | H | $C_2H_4OH$ |
| 50 | Cl | CN | $OC_4H_9$ | $NHCOCH_3$ | $4\text{-}OC_2H_4OH$ | H | $C_4H_9$ |
| 51 | $CH_3$ | CHO | $OCH_3$ | $NHCOCH_3$ | $4\text{-}OC_2H_4OH$ | H | $CH_3$ |

We claim:

1. A thiazoleazo dye of the formula I

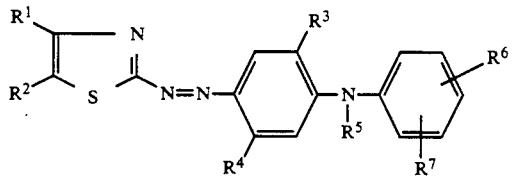

wherein $R^1$ is chlorine, bromine, $C_1$-$C_4$-alkoxy, $C_1$-$C_4$-alkylthio, phenylthio, $C_1$-$C_4$-alkylsulfonyl, phenylsulfonyl or $C_1$-$C_4$-alkoxycarbonyl, $R^2$ is cyano, formyl or radical of the formula

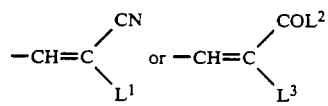

where $L^1$ is cyano, $C_1$-$C_4$-alkanoyl or $C_1$-$C_4$-alkoxycarbonyl, $L^2$ is $C_1$-$C_4$-alkyl or $C_1$-$C_4$-alkoxy, and $L^3$ is $C_1$-$C_4$-alkoxycarbonyl, $R^3$ is hydrogen or $C_1$-$C_6$-alkoxy, which may be hydroxyl- or $C_1$-$C_4$-alkoxy-substituted, $R^4$ is $C_1$-$C_6$-alkoxy, which may be hydroxyl-, $C_1$-$C_4$-alkoxy- or $C_1$-$C_4$-alkanoyloxy-substituted, a radical of the formula

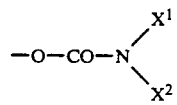

where $X^1$ and $X^2$ are identical or different and each is independently or the other $C_1$-$C_6$-alkyl, which may be $C_1$-$C_4$-alkoxy-substituted, or $X^1$ and $X^2$ together with the nitrogen atom joining them together are a five- or six-membered saturated heterocyclic radical with or without further hetero atoms, unsubstituted or hydroxyl-, chlorine-, cyano-, $C_1$-$C_4$-alkoxy- or phenoxy-substituted $C_1$-$C_4$-alkanoyloxy, unsubstituted or hydroxyl-, chlorine-, cyano-, $C_1$-$C_4$-alkoxy-, phenoxy- or $C_1$-$C_4$-alkanoyloxy-substituted $C_1$-$C_4$-alkanoylamino or unsubstituted or chlorine-, cyano-, nitro-, $C_1$-$C_4$-alkyl-, $C_1$-$C_4$-alkoxy-, $C_1C_4$-alkoxycarbonyl-or $C_1$-$C_4$-alkylsulfonyl-substituted phenyl, or $C_1$-$C_4$-alkanoylamino, which may be hydroxyl-, cyano- or $C_1$-$C_4$-alkoxy-substituted, $R^5$ is hydrogen, $C_1$-$C_6$-alkyl, which may be hydroxyl- or $C_1$-$C_4$-alkanoyloxy-substituted and can be interrupted by 1 or 2 oxygen atoms in either function, and $R^6$ and $R^7$ are each independently of the other hydrogen, halogen, $C_1$-$C_4$-alkyl, which may be hydroxyl- or $C_1$-$C_4$-alkanoyloxy-substituted, or $C_1$-$C_6$-alkoxy, which may be hydroxyl- or $C_1$-$C_4$-alkanoyloxy-substituted.

2. A thiazoleazo dye of the formula I:

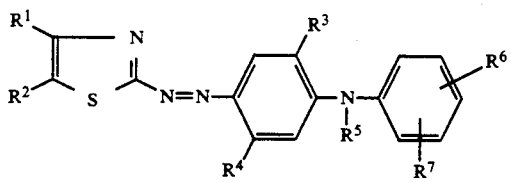

wherein $R^1$ is chlorine, phenylsulfonyl or $C_1$-$C_4$-alkoxycarbonyl, $R^2$ is cyano, formyl or a radical of the formula

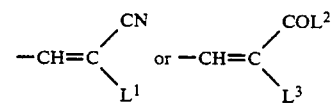

where $L^1$ is cyano or $C_1$-$C_4$-alkoxycarbonyl, $L^2$ is $C_1$-$C_4$-alkoxy, and $L^3$ is $C_1$-$C_4$-alkoxycarbonyl, $R^3$ is hydrogen or $C_1$-$C_6$-alkoxy, which may be hydroxyl- or $C_1$-$C_4$-alkoxy-substituted, $R^4$ is $C_1$-$C_6$-alkoxy, which may be hydroxyl-, $C_1$-$C_4$-alkoxy- or $C_1$-$C_4$-alkanoyloxy-substituted, $C_1$-$C_6$-dialkylaminocarbonyloxy or unsubstituted or $C_1$-$C_4$-alkoxy-substituted $C_1$-$C_4$-alkanoylamino, $R^5$ is hydrogen, $C_1$-$C_4$-alkyl, which may be substituted by hydroxyl and interrupted by an oxygen atom in ether function, $R^6$ is hydrogen, chlorine, bromine, $C_1$-$C_4$-alkyl, which may be hydroxyl-substituted, or $C_1$-$C_6$-alkoxy, which may be hydroxyl-substituted, and $R^7$ is hydrogen or $C_1$-$C_4$-alkyl, which may be hydroxyl-substituted.

* * * * *